Patented Oct. 8, 1968

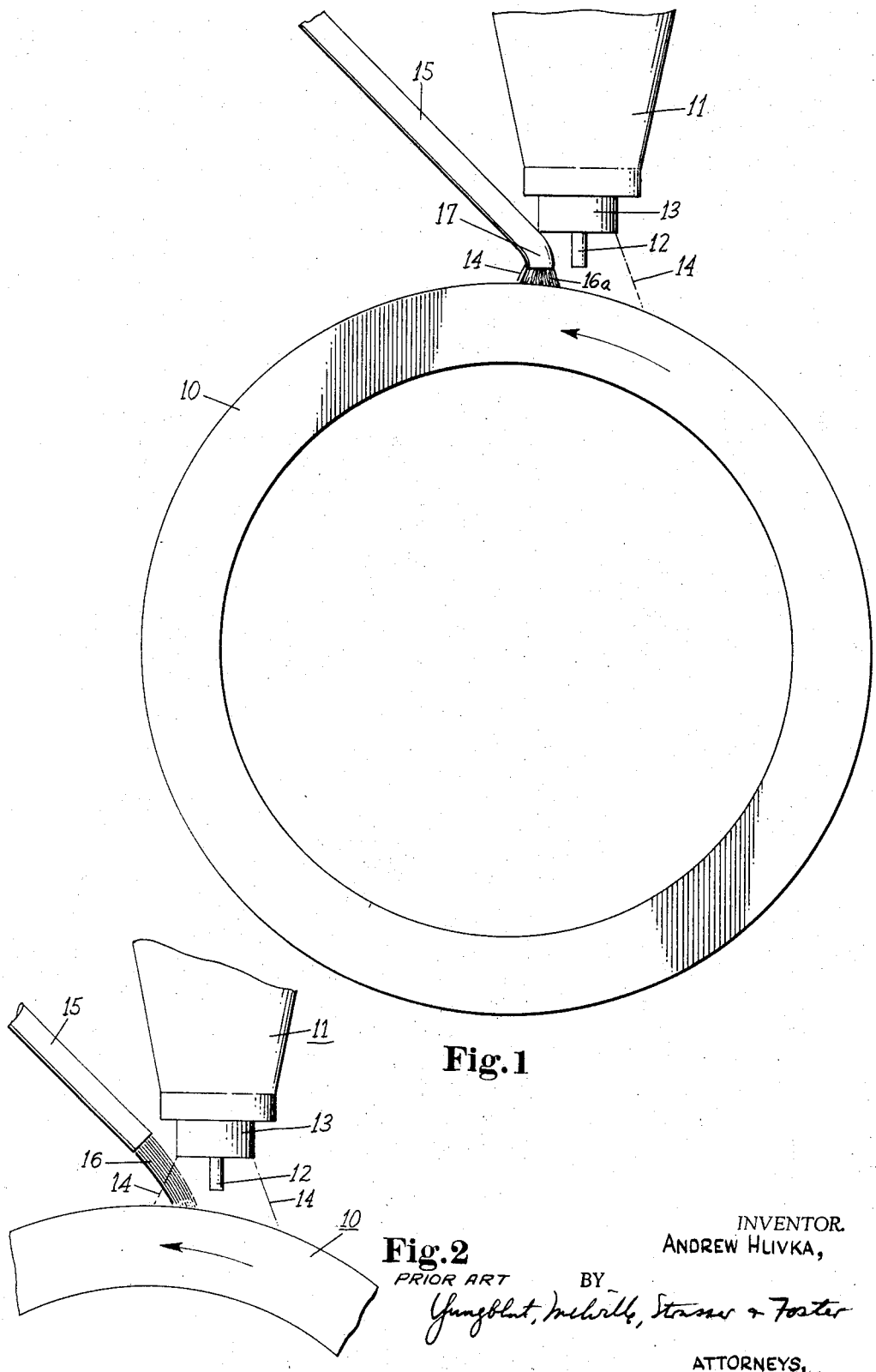

3,405,247
METHOD AND APPARATUS FOR PRODUCING SMOOTH OVERLAYS FOR TOOL JOINTS
Andrew Hiivka, West Mifflin, Pa., assignor to Armco Steel Corporation, Middletown, Ohio, a corporation of Ohio
Filed Dec. 3, 1964, Ser. No. 415,584
5 Claims. (Cl. 219—76)

ABSTRACT OF THE DISCLOSURE

In the production of smooth, hard surface overlays for tool joints and the like, wherein finely divided particles of a hard and refractory material (e.g. tungsten carbide) are applied to a weld puddle created by an inert-gas-shielded arc, the particles are mechanically shielded from the blast of the inert gas as they are fed into the gas stream, by means of a tube, which tube discharges the particles within the stream of the inert gas just above the weld puddle.

---

This invention relates to apparatus and method for producing smooth, wear-resistant overlays for tool joints. In the recovery of gas and oil from underground reservoirs, holes are drilled by means of conventional drilling tools which are connected to drill pipe or tubing. It is common practice to provide tool joints with hard surface overlays in order to reduce wear thereof. Such hard surface overlays have been applied by various welding procedures and have involved the appliaction of particles of a hard and refractory material such as tungsten carbide.

One of the problems heretofore encountered in this connection is that the hard surface overlay has not been smooth, so that when the tool joints contact the casing in the drilling of cased joints the casing is cut and worn.

One of the ways in which the hard surface could be made smoother would be to use finer mesh particles of tungsten carbide or other refractory material. Whereas generally the particle size has been such that the individual particles would pass through a twenty mesh screen, but be retained on a thirty mesh screen, and in some cases even small enough to pass through a forty mesh screen and be retained on a sixty mesh screen "U.S. Standard Sieve Size," attempts to use particles of a size that would pass through a sixty mesh screen, but would be retained on a one hundred or one hundred and forty mesh screen have been beset by many difficulties. It must be noted that the welding procedures usually employed are the so-called TIG method which involves the use of a non-consumable (usually tungsten) electrode with the arc shielded by an inert gas. When attempts are made to use finer mesh particles, they are blown aside by the blast effect of the stream of shielding gas and results have not been satisfactory.

Attempts to use finer size particles have involved the use of a binder, such as a nickel-chromium alloy; but the use of such a binder naturally reduces the percentage of tungsten carbide particles in the hard surfacing; and to the extent that this percentage is reduced, the coating is less wear-resistant.

It is, therefore, an object of the present invention to provide an apparatus whereby it is possible to use tungsten carbide particles which will pass through a sixty mesh screen, and be retained on a hundred and forty mesh screen, without using a binder material and without having the particles scattered by the blast effect of the inert shielding gas. It is another object of the invention to provide an apparatus element which can be used with presently existing and operating welding apparatus so that the cost of converting to the present method will be minimal.

These and other objects of the invention which will be described in greater detail hereinafter, or which will become apparent to those skilled in the art upon reading these specifications, are accomplished by that certain construction and by that series of method steps of which the following describes an exemplary embodiment.

Reference is made to the drawings forming a part hereof and in which:

FIG. 1 is a somewhat diagrammatic view showing the tool joint in end view and showing the relationship of the non-consumable electrode, the envelope of shielding gas, and the feed tube for the refractory material.

FIG. 2 is a fragmentary view similar to FIG. 1, showing the present day arrangements which have been used satisfactorily with coarse mesh particles.

Briefly, in the practice of the invention, the tungsten carbide particles are conveyed by gravity, through a feed tube, which is acted upon by a vibratory mechanism, and the refractory particles are conveyed in this manner into the envelope of shielding gas and released adjacent the weld puddle, where they will be incorporated with the base metal to form the hard surfacing.

Referring now in more detail to the drawings, the work piece is indicated at 10 and in this particular illustration it may be a tool joint such as is used in the drilling of oil or gas wells. A welding head is generally indicated at 11, and a tungsten electrode which is non-consumable is indicated at 12. A shielding gas which may be, and preferably is, an inert gas such as helium or argon is fed through the welding head and issues from a nozzle 13 in a substantially conical blast generally defined by the chain lines 14.

The tungsten carbide particles are fed through a feed tube 15.

By examination of FIG. 2, it will be seen that the particles of tungsten carbide issued from the feed tube 15 in a stream 16 which entered into the envelope of shielding gas and was deposited upon the work adjacent the puddle formed by the arc between the non-consumable electrode 12 and the work piece 10. This arrangement worked entirely satisfactorily with relatively coarse particles of refractory material. However, when it was attempted to use the apparatus of FIG. 2 with particles which would pass through a sixty mesh screen, very poor results were obtained because the blast effect of the inert gas issuing from the nozzle 13 scattered the very fine particles of refractory material, so that only a relatively small amount of the refractory material was deposited in the weld puddle.

According to the present invention, the very fine particles of refractory material are conveyed not only to a point adjacent the envelope, but into and through the envelope and are released just above the weld puddle in a stream indicated at 16a. This is accomplished by a tip 17 on the end of the feed tube. This tip is bent downwardly and extends the feed tube to a point just above the weld puddle. Preferably, the feed tube 15 is made of stainless steel, and the stainless steel tubing may easily be bent to the desired contour. In actual practice, where the feed tube is at an angle of about 45°, the bend in the tip 17 is about 25°. It will of course be understood that instead of bending the end of the feed tube 15, as at 17, a separate tip 17 may be attached to the conventional tube 15. Such separate tip may be of the same or a different diameter than the main tube.

While the entire outlet of the feed tube tip 17 has been shown within the envelope of inert gas, it is not absolutely necessary that the entire open end of the feed tube be within the envelope, but at least a portion thereof must enter into the envelope to a point adjacent the weld puddle.

In actual practice, the work piece, which in the case illustrated is a tool joint 10, is mounted so as to rotate about one revolution in twenty seconds. An arc between the non-consumable electrode 12 and the work piece forms a weld puddle, into which the refractory particles are dropped. The electrode may have a diameter of about one-eighth inch, and during each revolution of the joint, the electrode is advanced so that the hard surface layers overlap about 0.175 inch. Thereby a smooth carbide surface is provided throughout the length of the tool joint. Generally the hard surface facing is about three inches axially of the work piece or tool joint, but it may vary from about one and a half inches to about four inches, depending upon the needs of the user.

By following the procedures here described, a very smooth tungsten carbide surface has been achieved on tool joints. By the practice of the process and by the use of the apparatus herein described, it has been possible to use tungsten carbide having particles of a size which will pass through a sixty mesh screen but will be retained on a hundred mesh or a hundred and forty mesh screen. Even finer particle sizes may be used. By releasing the particles within the envelope closely adjacent the weld puddle, the inert gas is prevented from blowing the fine particles away from the puddle, whereby the particles would be wasted. By this procedure, it is also possible to use particles of the fine size described above, without the necessity of employing a metallic alloy binder, such as has been used in the past. Generally where attempts have been made to use refractory particles of the presently involved small size, it has been necessary to use a nickel-chromium alloy binder. It will be readily understood that if such a binder constitutes twenty percent of the particle mix passing through the feed tube, that only eighty percent of the material passing through the feed tube is of the refractory material, and therefore the hard surface coating is not good as if all the particles were of tungsten carbide.

While the use of helium is preferred, other inert gases may be used. It will also be understood that, if desired, the outside diameter of the joint may be increased by feeding wire into the pool as disclosed in the Richter U.S. Patent No. 2,841,687.

The vibrator hopper and other portions of the apparatus which are not necessary to an understanding of the present invention have not been illustrated nor described in detail, because they are well known in the art.

It will be clear that various modifications may be made without departing from the spirit of the invention.

The embodiments of the invention in which an exclusive property or privilege is claimed are defined as follows:

1. The method of hard surfacing a metal work piece to form thereon a wear-resistant band, which includes the steps of striking an arc between a non-consumable electrode and said work piece to form a weld puddle on said work piece, shielding the arc and weld puddle with a stream of inert gas, conveying particles of hard and refractory material into said stream of inert gas while mechanically shielding them from the blowing action of said stream, and releasing said mechanically shielded particles just above said puddle and within said stream, while moving said work piece with respect to said electrode.

2. The method of claim 1, wherein the smallest of said particles are of a size to be retained on a one hundred and forty mesh screen.

3. The method of claim 1, wherein said particles are tungsten carbide.

4. The method of claim 1, wherein said particles are tungsten carbide, and the smallest of said particles is of a size to be retained on a hundred and forty mesh screen.

5. In apparatus for hard surfacing a metal work piece to form thereon a wear-resistant band, wherein the work piece is caused to move past a non-consumable electrode, and wherein an arc is formed between said electrode and work piece to form a weld puddle on said work piece, and said arc is shielded by a stream of inert gas surrounding said electrode and covering said weld puddle, and particles of a hard and refractory material are fed to said weld puddle by a tube through which said particles pass by gravity; a nozzle on said tube extending into said stream of inert gas and having a downwardly turned tip portion terminating adjacent said puddle, said nozzle protecting said particles from the blast effect of said stream of inert gas.

References Cited

UNITED STATES PATENTS

| 2,709,213 | 5/1955 | Gibson | 219—76 |
| 2,841,687 | 7/1958 | Richter. | |

FOREIGN PATENTS 778,785    7/1957    Great Britain.

RICHARD M. WOOD, *Primary Examiner.*

J. G. SMITH, *Assistant Examiner.*